US009483533B2

United States Patent
Chen et al.

(10) Patent No.: US 9,483,533 B2
(45) Date of Patent: Nov. 1, 2016

(54) METHOD AND APPARATUS FOR PROCESSING TIME SERIES DATA

(71) Applicant: International Business Machines Corporation, Armonk, NY (US)

(72) Inventors: Xiao Yan Chen, Beijing (CN); Sheng Huang, Shanghai (CN); Kai Liu, Beijing (CN); Chen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/955,473

(22) Filed: Jul. 31, 2013

(65) Prior Publication Data

US 2014/0040276 A1 Feb. 6, 2014

(30) Foreign Application Priority Data

Jul. 31, 2012 (CN) .......................... 2012 1 0271367

(51) Int. Cl.
*G06F 17/30* (2006.01)

(52) U.S. Cl.
CPC ... *G06F 17/30551* (2013.01); *G06F 17/30339* (2013.01)

(58) Field of Classification Search
CPC ............. G06F 17/30353; G06F 17/22; G06F 17/2247; G06F 17/2252; G06F 17/30153; G06F 17/40; G06F 17/835; G06F 17/30551
USPC ........................................................ 707/746
See application file for complete search history.

(56) References Cited

U.S. PATENT DOCUMENTS

| 7,853,568 B2 | 12/2010 | Mukhi |
| 8,095,632 B2 | 1/2012 | Hessmer et al. |
| 8,112,425 B2 | 2/2012 | Baum et al. |
| 2007/0180137 A1* | 8/2007 | Rajapakse ..................... 709/231 |
| 2007/0260985 A1* | 11/2007 | Utagawa et al. ............. 715/721 |

(Continued)

FOREIGN PATENT DOCUMENTS

| CN | 1476726 A | 2/2004 |
| CN | 101984421 A | 3/2011 |

OTHER PUBLICATIONS

Bonnet et al., "Towards Sensor Database Systems," Springer, 2001 edition, (Feb. 8, 2001).

*Primary Examiner* — Hosain Alam
*Assistant Examiner* — Saba Ahmed
(74) *Attorney, Agent, or Firm* — Scully, Scott, Murphy & Presser, P.C.; Jennifer Davis, Esq.

(57) ABSTRACT

The present invention relates to processing of time series data. There is disclosed a method and apparatus for processing time series data, the method comprising: receiving a time series data set, wherein each element of the time series data set contains a timestamp and an original value associated with the timestamp, and times represented by all timestamps constitute a time series having fixed time intervals; converting each original value into a coded value occupying a smaller storage space, according to a predetermined monotone numerical compression coding scheme; dividing the times represented by all timestamps into a plurality of time intervals having a predetermined length; assembling coded values corresponding to all timestamps within each time interval into a data package such that the data package contains coded values arranged in an order of timestamps; and storing in a database record each data package and its associated identification of a time interval.

16 Claims, 8 Drawing Sheets

(56) References Cited

U.S. PATENT DOCUMENTS

| | | | |
|---|---|---|---|
| 2009/0063603 A1* | 3/2009 | Droz et al. | 708/400 |
| 2010/0049694 A1 | 2/2010 | Deffler | |
| 2010/0293452 A1* | 11/2010 | Suzuki | 715/234 |
| 2010/0325132 A1 | 12/2010 | Liu et al. | |
| 2011/0196528 A1 | 8/2011 | Baier et al. | |
| 2011/0216829 A1 | 9/2011 | Raveendran | |
| 2012/0204094 A1* | 8/2012 | Liang | 715/234 |
| 2013/0013556 A1* | 1/2013 | Yamada | 707/609 |
| 2013/0289977 A1* | 10/2013 | Tanaka et al. | 704/9 |

* cited by examiner

| Line_No | TS | OV |
|---|---|---|
| ... | ... | ... |
| 1 | 20120716.10:47:00 | 32.0 |
| 2 | 20120716.10:47:10 | 31.8 |
| 3 | 20120716.10:47:20 | 31.9 |
| 4 | 20120716.10:47:30 | 31.7 |
| 5 | 20120716.10:47:40 | 32.2 |
| 6 | 20120716.10:47:50 | 32.2 |
| ... | ... | |

| Line_No | Device_id | TS | Temp |
|---|---|---|---|
| | ... | ... | ... |
| 1 | 9093 | 20120716.10:47:00 | 32.0 |
| 2 | 9093 | 20120716.10:47:10 | 31.8 |
| 3 | 9094 | 20120716.10:47:10 | 31.0 |
| 4 | 9093 | 20120716.10:47:20 | 31.9 |
| 5 | 9095 | 20120716.10:47:20 | 32.5 |
| 6 | 9093 | 20120716.10:47:30 | 31.7 |
| 7 | 9094 | 20120716.10:47:20 | 31.3 |
| 8 | 9094 | 20120716.10:47:30 | 31.4 |
| 9 | 9095 | 20120716.10:47:30 | 32.2 |
| 10 | 9093 | 20120716.10:47:40 | 32.2 |
| | ... | ... | ... |

| Line_No | TS | CV | B1B2 |
|---|---|---|---|
| ... | ... | ... | |
| 1 | 20120716.10:47:00 | 21496 | 0X53F8 |
| 2 | 20120716.10:47:10 | 21443 | 0X53C3 |
| 3 | 20120716.10:47:20 | 21470 | 0X53DE |
| 4 | 20120716.10:47:30 | 21417 | 0X5446 |
| 5 | 20120716.10:47:40 | 21548 | 0X542C |
| 6 | 20120716.10:47:40 | 21548 | 0X542C |
| ... | ... | | |

522

| Line_No | TS | CV | B1B2B3 |
|---|---|---|---|
| ... | ... | ... | |
| 1 | 20120716.10:47:00 | 1653925 | 0X193CA5 |
| 2 | 20120716.10:47:10 | 1644230 | 0X1916C6 |
| 3 | 20120716.10:47:20 | 1649078 | 0X1929B6 |
| 4 | 20120716.10:47:30 | 1639379 | 0X1903D3 |
| 5 | 20120716.10:47:40 | 1663606 | 0X196276 |
| 6 | 20120716.10:47:40 | 1663606 | 0X196276 |
| ... | ... | | |

Fig.5

|   |   |   | TVP |   |   |   |
|---|---|---|---|---|---|---|
|   | 21496 | 21443 | 21470 | 21417 | 21548 | 21548 |

641

| ST | TVP |   |   |   |   |   |
|---|---|---|---|---|---|---|
| 20120716.10:47:00 | 21496 | 21443 | 21470 | 21417 | 21548 | 21548 |

651

| ST | CTR | TVP |   |   |   |   |   |
|---|---|---|---|---|---|---|---|
| 20120716.10:47:00 | 6 | 21496 | 21443 | 21470 | 21417 | 21548 | 21548 |

652

| ST | TVP |
|---|---|
| ... | ... |
| 20120716.10:47:00 | 21496, 21443, 21470, 21417, 21548, 21548 |
| 20120716.10:48:00 | ... |
| 20120716.10:49:00 | ... |
| 20120716.10:50:00 | ... |
| ... | ... |
| ... | ... |

Table_650

Fig.6

| VTP | | |
|---|---|---|
| 0XF8, 20120716.10:47:00 | 0XC3, 20120716.10:47:10 | 0XDE, 20120716.10:47:20 |

741

| VTP | | | |
|---|---|---|---|
| 20120716.10:47:00 | <0XF8, 0> | <0XC3, 10> | <0XDE, 20> |

742

| B1 | VTP | | | |
|---|---|---|---|---|
| 0X53 | 20120716.10:47:00 | <0XF8, 0> | <0XC3, 10> | <0XDE, 20> |

751

| B1 | CTR | VTP | | | |
|---|---|---|---|---|---|
| 0X53 | 3 | 20120716.10:47:00 | <0XF8, 0> | <0XC3, 10> | <0XDE, 20> |

752

| B1 | VTP |
|---|---|
| ... | ... |
| 0X52 | ... |
| 0X53 | 20120716.10:47:00, <0XF8, 0>, <0XC3, 10>, <0XDE, 20> |
| 0X54 | |
| 0X55 | |
| ... | ... |

Table 750

METHOD AND APPARATUS FOR PROCESSING TIME SERIES DATA

BACKGROUND

The present invention relates to the processing of time series data, and more specifically, to storage and retrieval of time series data in a database.

In applications involving the Internet of Things/sensors, it is required to process in real time large-scale time series data such as stock price fluctuations, temperature variations, blood pressure differences, tide tables, etc. Time series data consist of times and values.

Time series data contains timestamps and values associated with timestamps, e.g. containing sampling times and sampling values from a sensor. In various applications, such time series data need to be persistently stored in a database for query. Usually an approach to storing time series data in the prior art is to store the sampling times and the sampling values in one-to-one correspondence in a database. In association with such an approach, sampling times and sampling values are respectively used as keywords of an index file when creating the index file for the purpose of query. In such storage and indexed modes, data and index files occupy a large storage space, and the query speed is affected during data query because more I/O operations are needed. Waste of storage spaces during persistent storage of massive time series data and huge throughput requirements during querying massive time series data become especially prominent.

Therefore, there is a need to persistently store massive time series data with a low storage capacity while conveniently and rapidly querying such-stored massive time series data.

SUMMARY

In view of the existing situation, it is an object of the present invention to provide an improved method and apparatus for processing time series data.

On one hand, there is disclosed a method and apparatus for processing time series data, the method comprising: receiving a time series data set, wherein each element of the time series data set contains a timestamp and an original value associated with the timestamp, and times represented by all timestamps constitute a time series having fixed time intervals; converting each original value into a coded value occupying a smaller storage space according to a predetermined monotone numerical compression coding scheme; dividing the times represented by all timestamps into a plurality of time intervals having a predetermined length; assembling coded values corresponding to all timestamps within each time interval into a data package such that the data package contains coded values arranged in an order of timestamps; and storing in a database record each data package and its associated identification of a time interval.

On the other hand, there is disclosed a method and apparatus for processing time series data, the method comprising: receiving a time series data set, wherein each element of the time series data set contains a timestamp and an original value associated with the timestamp; converting each original value into a coded value occupying a smaller storage space, according to a predetermined monotone numerical compression coding scheme; dividing coded values into coded value intervals; for each coded value interval, assembling each coded value in the coded value interval and its timestamp into a data package such that the data package contains a low-order byte of each coded value and a timestamp corresponding to the coded value; and storing in a database record each data package together with an identification characterizing a corresponding coded value interval.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
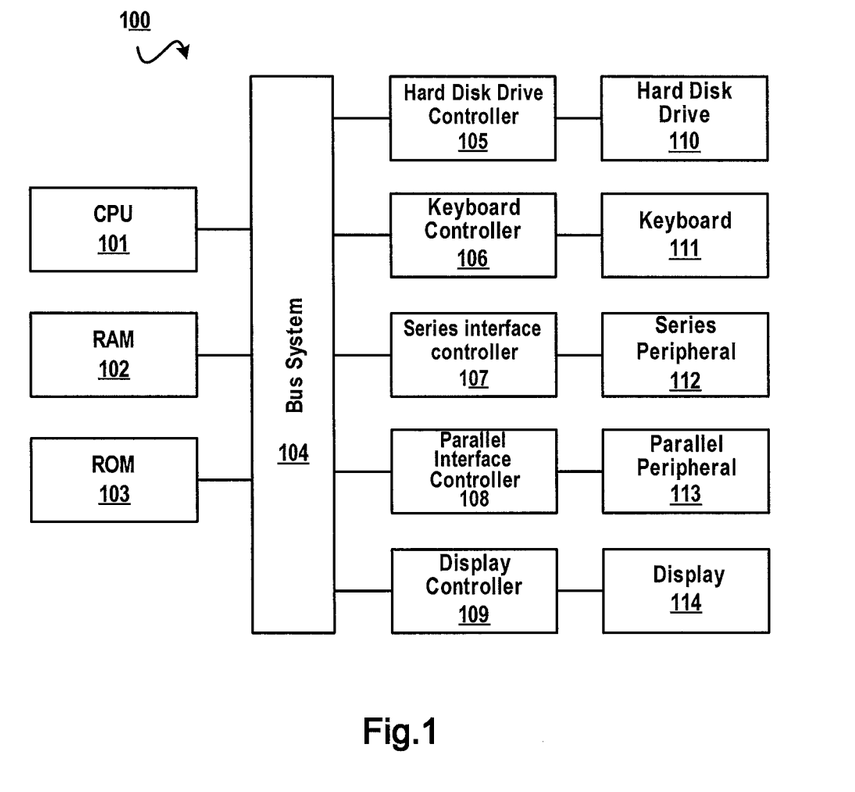
FIG. 1 shows an exemplary computer system 100 which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention relates to processing of time series data, which may be implemented at computer system 100 shown in FIG. 1.

It is a general concept of the present invention to, in view of characteristics of time series data, compress time series data and store compressed time series data according to a corresponding data structure, thereby reducing a storage space required for storage of time series data and increasing the query speed of a range query of time series data.

The various embodiments are now illustrated with respect to the accompanying drawings.

Figure 2:
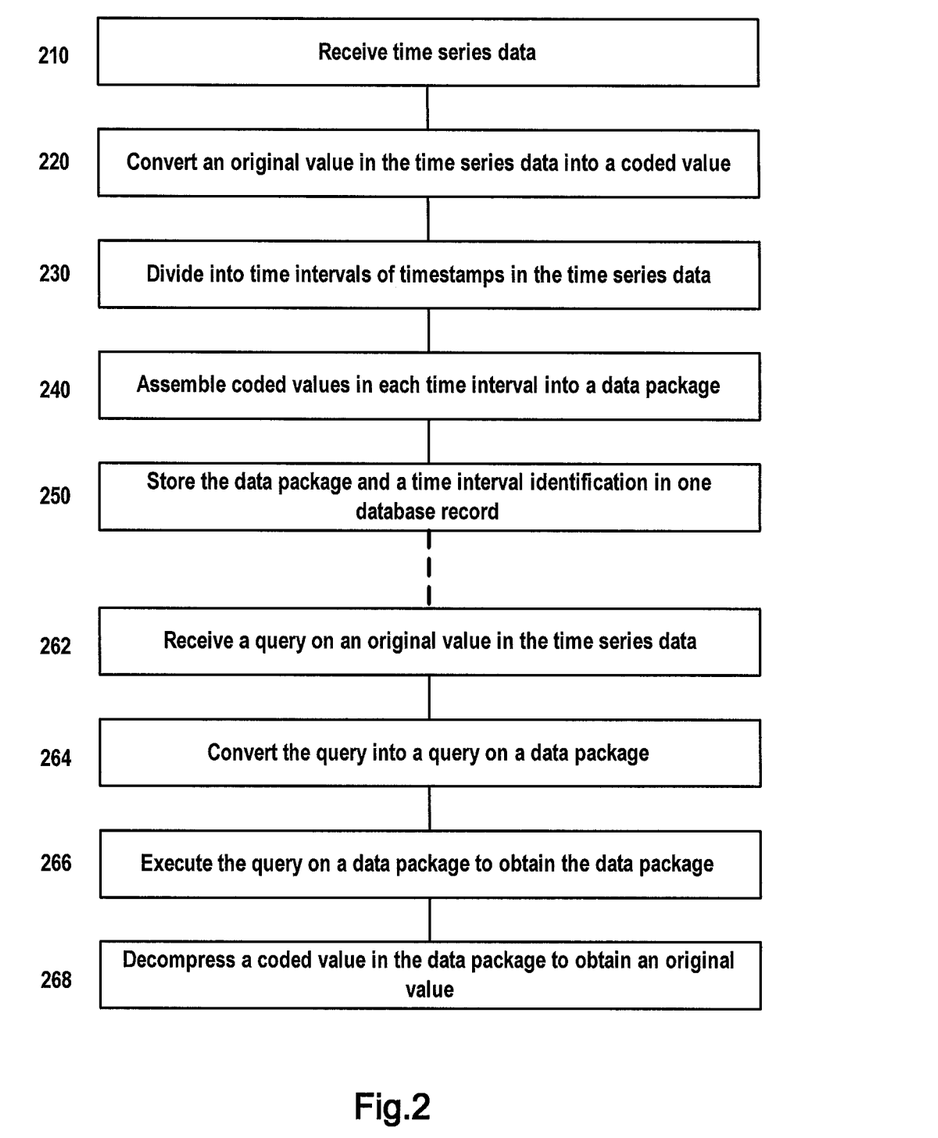
FIG. 2 shows a schematic flowchart of a method according to one embodiment of the present invention.

First refer to FIG. 2. This figure schematically shows a flowchart of a method for processing time series data according to one embodiment of the present invention. The method for processing time series data as shown in FIG. 2 comprises the following steps.

In Step 210, a time series data set is received, wherein each element of the time series data set contains a timestamp and an original value associated with the timestamp, and times represented by all timestamps constitute a time series having fixed intervals.

Figure 4A:
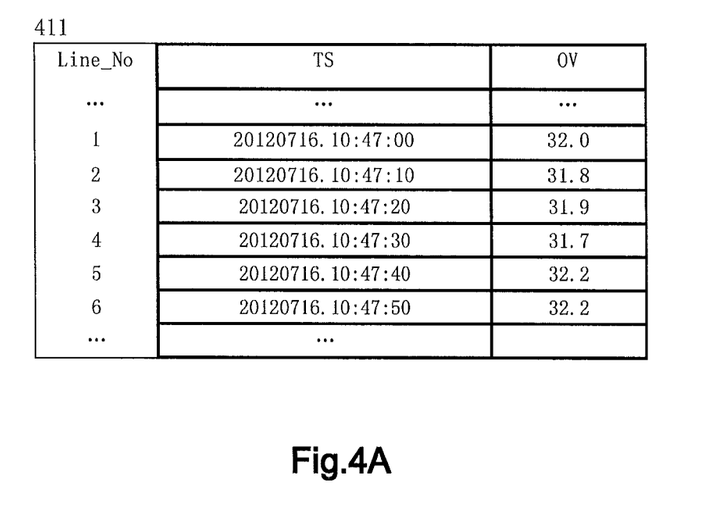
FIG. 4A schematically represents a time series data set.

FIG. 4A schematically shows an example of a time series data set. In this figure, Table 411 represents a time series data set S. In the header of Table 411, "Line_No" represents a line number; "TS" represents a timestamp; and "OV" represents an original value. Each line of Table 411 represents an element of time series data set S, each element containing a timestamp and an original value associated with the timestamp. For example, the element at the 1$^{st}$ line contains a timestamp "20120716.10:47:00" and a value "32.0" associated with this timestamp, the timestamp representing a time "10:47:00 on Jul. 16, 2012." Times represented by all timestamps in Table 411 constitute a time series having fixed intervals. For example, an interval between a time represented by a timestamp "20120716.10:47:10" at the 2$^{nd}$ line and a time represented by the timestamp "20120716.10:47:00" at the 1$^{st}$ line is 10 seconds; an interval between times represented by timestamps at the 3$^{rd}$ line and the 2$^{nd}$ line is also 10 seconds, and so on and so forth.

To facilitating description, an element in time series data set S is also referred to as "timestamp/original value pair," recorded as "<TS, OV>." For example, the element at the 1$^{st}$ line of Table 411 is recorded as <TS,OV>=<20120716.10:47:00,32.0>, representing the timestamp "20120716.10:47:00" and its associated original value "32.0."

TS (timestamp) and OV (original value) in <TS, OV> are correlated with each other. In different application, the original value might have different physical meanings. For example, <20120716.10:47:00,32.0> may be used to represent a sampling time and a sampling value generated by a temperature sensor, just as shown in FIG. 4B.

Figure 4B:
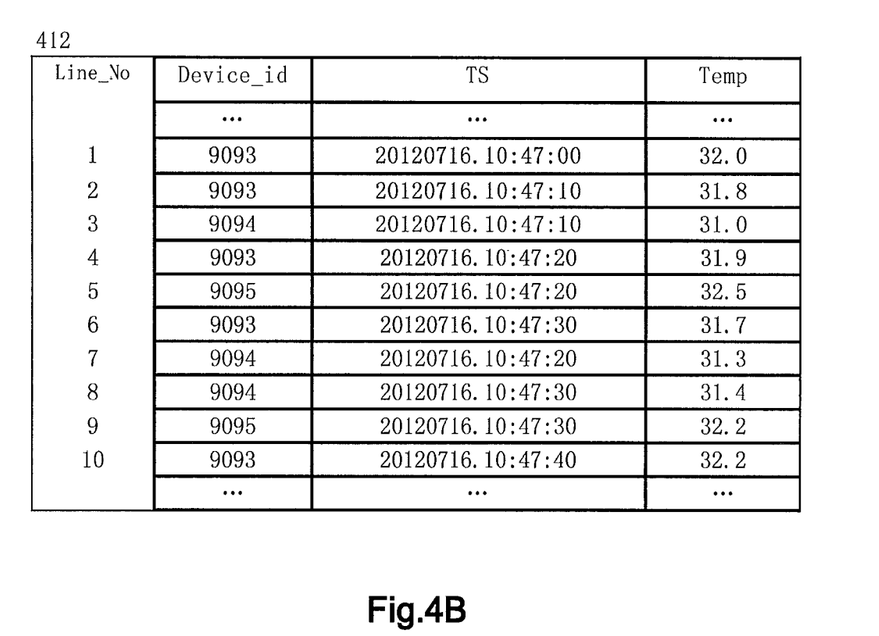
FIG. 4B schematically represents the time series data generated by a sensor.

With reference to FIG. 4B, this figure schematically represents time series data generated by a sensor. More specifically, FIG. 4B schematically represents sampling times and sampling values received from different temperature sensors (not shown) by Table 412. In the header of Table 412, "Device_id" represents an identifier of a sensor, "TS" represents a sampling time, and "Temp" represents a temperature sampling value. Therefore, each line of Table 412 represents respectively a temperature value measured at a certain sampling time by a certain temperature sensor. For example, the 1$^{st}$ line represents a temperature value "32.0" measured at the time "20120716.10:47:00" by a sensor with an identifier of "9093"; the 3$^{rd}$ line represents a temperature value "31.8" measured at the time "20120716.10:47:10" by another sensor (with an identifier of "9094") . . . .

According to one embodiment of the present invention, time series data set S in Step 210 may contain time series data received from a sensor, a timestamp and an original value associated with the timestamp as contained in each element of time series data set S represents a sampling time of the sensor and a sampling value measured at the sampling time, respectively.

As an example, time series data set S shown in Table 411 may be regarded as a subset of sampled data shown in Table 412, wherein each <TS, OV> of Table 411 is a sampling time and a sampling value from one identical temperature sensor with an identifier of "9093." In this case, timestamp TS represents a sampling time of the temperature sensor, and original value OV represents a temperature value associated with the sampling time.

Hereinafter the various embodiments of the present invention will be illustrated by taking time series data set S as an example. Note Table 411 shows only 6 elements contained in time series data set S, which, however, is merely exemplary. In practical applications, the amount of elements contained in a time series data set is huge. For example, if a sensor's sampling frequency is 10 Hz, then the sensor may generate 600 timestamp/original value pairs in 1 minute.

Now return to FIG. 2. Step 220 is executed after Step 210.

In Step 220, each original value is converted into a coded value occupying a smaller storage space, according to a predetermined monotone numerical compression coding scheme.

Various embodiments of Step 220 are illustrated below by way of example.

Numerical compression refers to converting an original value into a coded value such that a storage space required to store the coded value is smaller than a storage space required to store the original value. A monotone numerical compression coding scheme refers to that there exists a one-to-one correspondence between an original value and a coded value converted from a numerical compression; in other words, a coded value may be restored to an original value by using the same monotone numerical compression coding scheme.

According to one embodiment of the present invention, the predetermined monotone numerical compression coding scheme is a quantization compression coding scheme.

The quantization compression coding scheme is a monotone numerical compression coding scheme; by means of quantization compression, a double-precision floating-point of 8 bytes may be compressed into an integer of only 2 bytes. An algorithm of the quantization compression coding scheme is as shown by Equation (1) below:

$$CV=[(OV-LB)/(UB-LB)*65536] \qquad \text{Equation (1)}$$

In Equation (1), symbol "CV" represents a coded value or a compressed value, "OV" represents an original value; "UB" represents an Upper Bound; "LB" represents a Lower Bound; and "[ ]" represents a rounding operation.

The original value OV may be any value, e.g. a double-precision floating-point number of 8 bytes. The Upper Bound UB and the Lower Bound LB are both constants. In practically implementing the present invention, appropriate values may be set for the constants UB and LB according to concrete applications (such as a range of sampling values), empirical data and precision requirements.

For example, time series data set S in Table 411 represents data of temperature values generated by a temperature sensor and involving different sampling times. In this case, according to characteristics of temperature values, it may be set LB=−50 and UB=200.

For example, regarding the original value of the 1$^{st}$ element of the time series data set S, OV=32.0, the process for converting the original value into the coded value CV according to Equation (1) is as below:

$$CV=[((32.0-(-50))/(200-(-50))*65536]= \\ [21495.808]=21496$$

"32.0" is a double-precision floating-point with a length of 8 (bytes), i.e. a storage space of 8 bytes is required in order to store the original value "32.0"; a hexadecimal value of the coded value CV="21496" is "OX53F8," with a length of 2 (bytes). This means that the length difference between the original value and the corresponding coded value is 6 bytes.

To facilitate illustration, the "length' of a numerical value mentioned below refers to the byte number required by this numerical value. A symbol "OX" is a prefix, representing that a numerical value following immediately is in hexadecimal format. For example, "OX53F8" represents a 2-byte hexadecimal value "53F8," which may be recorded as B1B2=0X53F8, i.e. the high-order byte B1=0X53 and the low-order byte B2=0XF8.

Figure 5:
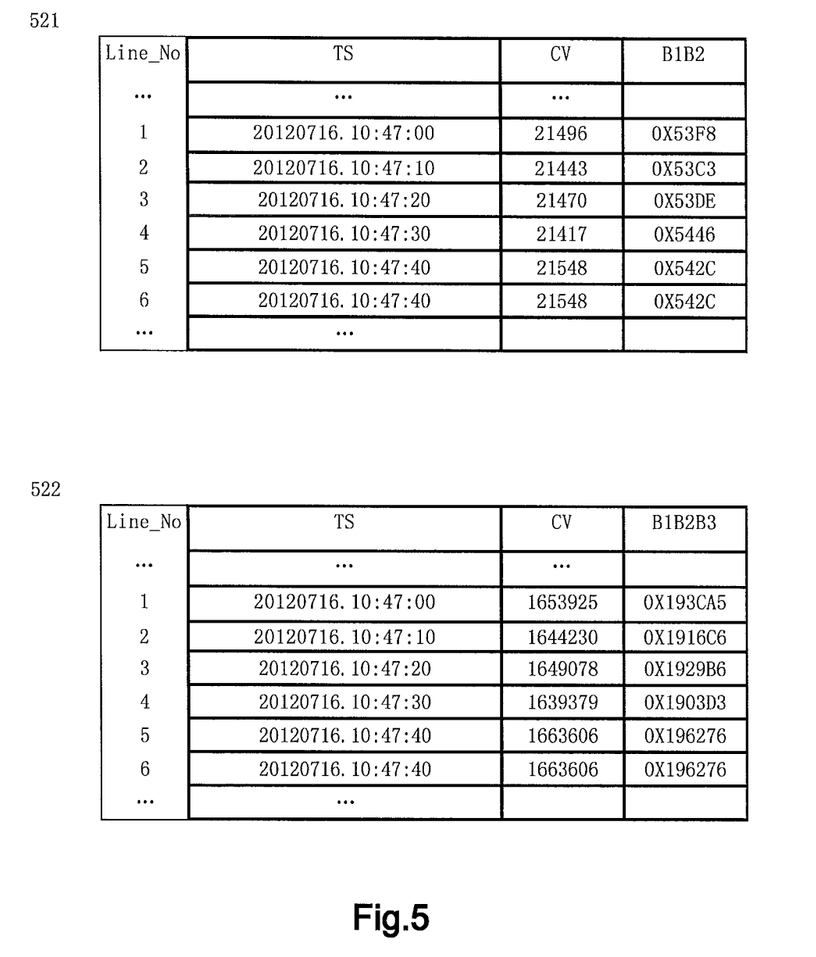
FIG. 5 schematically represents coded values generated from converting original values in the time series data set shown in FIG. 4A according to the embodiment of the present invention.

Similarly, other original values shown in Table 411 may be converted into corresponding coded values, with a result as shown in the $3^{rd}$ column of Table 521 in FIG. 5. For example, original value OV=32.0 is converted into coded value CV=21496, original value OV=31.8 is converted into coded value CV=21443 . . . and original value OV=32.2 is converted into coded value CV=21548. The $4^{th}$ column shows hexadecimal representation of each coded value, wherein symbol "B1B2" in the header represents a two-byte hexadecimal value. For example, the hexadecimal representation of coded value CV=21496 is B1B2=0X53F8, wherein the high-order byte B1=0X53 and the low-order byte B2=0XF8.

The quantization compression coding scheme is characterized in that an original value OV in double-precision floating-point format occupying 8 bytes may be converted into an integral coded value CV occupying 2 bytes, or a coded value CV may be restored to an original value OV. It can be verified that, although a rounding operation is employed in Equation (1), the loss of precision caused by the rounding operation may be reduced to a negligible extent by setting appropriate parameters according to a concrete application and experience.

Using a quantization compression coding scheme as the predetermined monotone numerical compression coding scheme has been illustrated above. However, the present invention is not limited to this. According to one embodiment of the present invention, the predetermined monotone numerical compression coding scheme in Step 220 may further be an arc tangent compression coding scheme.

Arc tangent compression coding is also a monotone numerical compression coding method, which can compress a double-precision floating-point of 8 bytes into an integer occupying a storage space of only 3 bytes. An algorithm of arc tangent compression coding is as shown by Equation (2) below:

$$CV=[256*256*256*\arctan(OV/100)/\pi] \quad \text{Equation (2)}$$

Wherein symbol "CV" represents a coded value; "OV" represents an original value; "arctan( )" is an arc tangent function; "π" is circumference ratio; and "[ ]" represents a rounding operation.

Take an original value OV=32.0 in time series data set S as an example.

The hexadecimal format of value 1653925 is 0X193CA5, occupying 3 bytes.

$$CV=[256*256*256*\arctan(32.0/100)/\pi]=1653925$$

Similarly, other original values shown in Table 411 may be converted into corresponding coded values, with a result as shown in Table 522 in FIG. 5. The structure of Table 522 is similar to that of Table 521, except that symbol "B1B2B3" in the header shown in the $4^{th}$ column represents a 3-byte hexadecimal value. For example, the hexadecimal representation of coded value CV=1653925 is B1B2B3=0X193CA5, wherein the high-order byte B1=0X19 and the low-order bytes B2B3=0X3CA5.

By means of the arc tangent compression coding scheme, an original value OV in double-precision floating-point format and occupying 8 bytes may be converted into an integral coded value CV occupying 3 bytes or a coded value CV may be restored to an original value OV.

The two embodiments of a monotone compression coding scheme have been illustrated by the above examples. Those skilled in the art should understand the present invention is not limited to this. In implementing the present invention, any other monotone compression coding scheme may also be adopted. An advantage of adopting a monotone compression coding scheme is after obtaining a coded value from an original value by a coding scheme, the original value may be derived from the coded value by the same coding scheme without requiring an additional storage space to store a mapping relationship between original values and coded values, thereby saving a storage space.

Step 230 is executed following Step 220.

In Step 230, the times represented by all timestamps are divided into a plurality of time intervals having a predetermined length.

Take time series data set S as an example. Suppose the predetermined length is 1 minute, then the times (20120716.10:47:00, 20120716.10:47:10, . . . ) represented by all timestamps in set S may be divided into a plurality of 1-minute time intervals, for example, 20120716.10:47:00 to 20120716.10:48:00 (excluded) is a 1-minute time interval. The number of timestamps displayed in Table 411 is rather limited, whereas times represented by timestamps that are not shown may be divided into more 1-minute time intervals, for example, 20120716.10:48:00 to 20120716.10:49:00 (excluded)

. . .

In Step 240, coded values corresponding to all timestamps in each time interval are assembled into a data package, such that the data package contains coded values arranged in an order of the timestamps.

A coded value is generated by converting an original value with a corresponding timestamp. According to an association between the original value and the timestamp, the coded value also has the same association with the timestamp corresponding to the original value.

For example, coded values CVs corresponding to timestamps in the time interval 20120716.10:47:00 to 20120716.10:48:00 (excluded) are 21496, 21443, 21470, 21417, 21548 and 21548. Therefore, these coded values are assembled into a data package (TVP) such that the data package TVP contains coded values 21496, 21443, 21470, 21417, 21548 and 21548 that are arranged in an order of timestamps.

Figure 6:
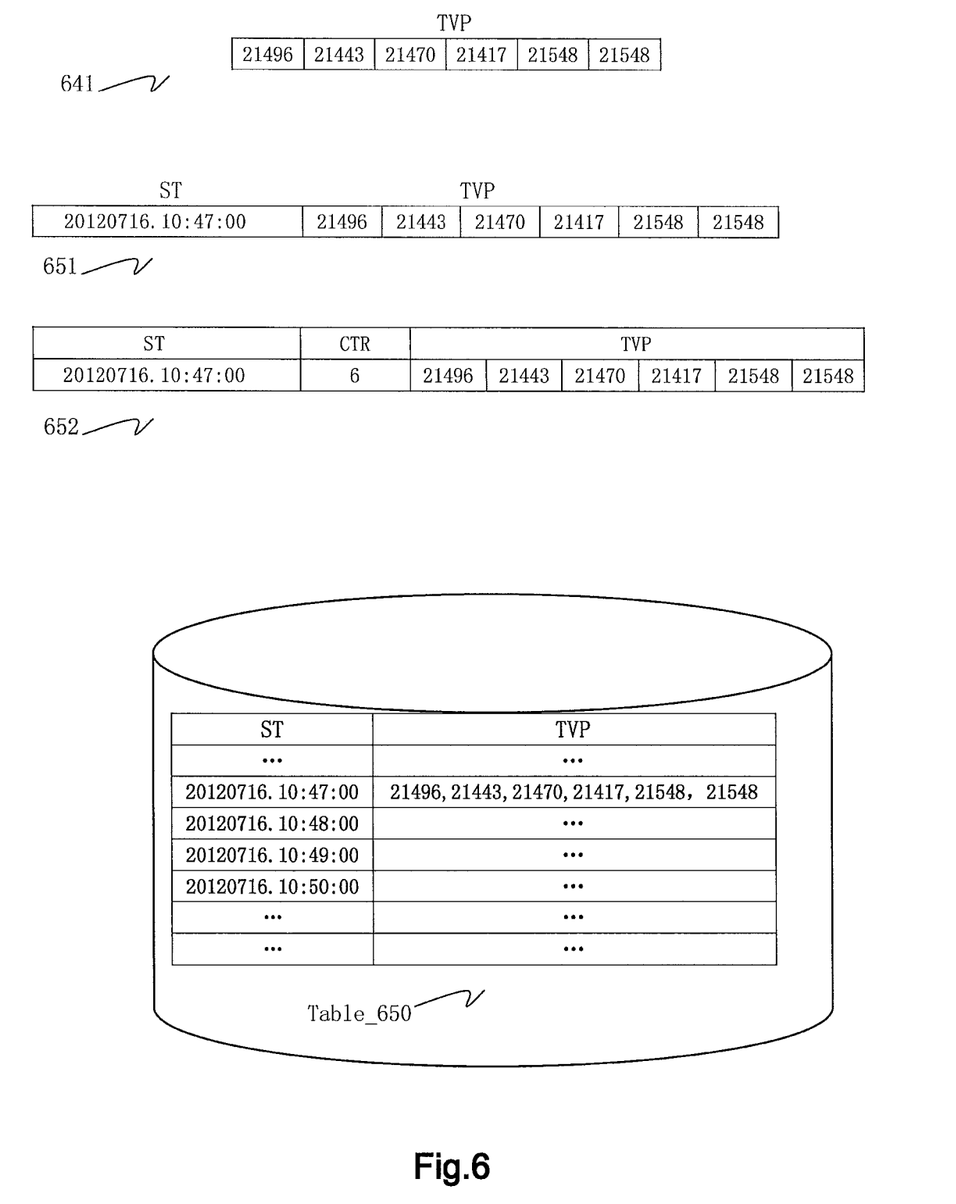
FIG. 6 schematically represents various data structures for storing time series data according to one embodiment of the present invention.

With reference to FIG. 6, this figure schematically shows various data structures for storing time series data according to one embodiment of the present invention.

In FIG. 6, numeral 641 denotes a data package. Specifically, a data package 641 contains 6 coded values 21496, 21443, 21470, 21417, 21548 and 21548 corresponding to timestamps in the time interval 20120716.10:47:00 to 20120716.10:48:00 (excluded), which coded values are arranged in an order of timestamps and each of which coded values occupies two bytes.

After Step 240, the flow proceeds to Step 250 in which each data package and an identification of a time interval associated with the data package are stored in a database record.

With reference to FIG. 6, a numeral 651 in this figure denotes an example of database record. As shown in this figure, a database record 651 at least contains two fields, namely a time interval identification ST and a data package TVP.

Since a time interval having a predetermined length may be identified by start time of the time interval, according to one embodiment of the present invention, a start time ST of a time interval is used as an identification of the time interval, i.e. a time interval identification.

A time interval associated with the data package TVP field in database record 651 as shown in FIG. 6 is 20120716.10: 47:00 to 20120716.10:48:00 (excluded). Therefore, a start time 20120716.10:47:00 of the time interval is used as an identification ST of the time interval, representing that the time interval is a time interval starting from 20120716.10: 47:00 with a length of 1 minute.

Those skilled in the art should understand where times represented by timestamps constitute a time series having fixed intervals (e.g. 10 seconds), a timestamp corresponding to any coded value contained in a data package may be derived using such a data structure.

For example, a timestamp corresponding to the first coded value 21496 in data package TVP equals start time ST+0*10, i.e. 20120716.10:47:00; a timestamp corresponding to the second coded value 21443 equals start time ST+1*10 seconds, i.e. 20120716.10:47:10, . . . and so on and so forth.

With reference to FIG. 6, symbol Table_650 in this figure denotes an example of database table, and a database table Table_650 is a database table corresponding to Table 411. Database table Table_650 as shown in this figure contains a plurality of database records having a data structure as shown by numeral 651. For example, a database record contains a start time ST=20120716.10:47:00 and a corresponding data package TVP=<21496, 21443, 21470, 21417, 21548, 21548>.

Those skilled in the art should understand that in practically implementing the present invention, time intervals may be characterized in other manners. For example, a time interval having a fixed length may be characterized by an end time of the time interval. Therefore, the embodiment that a time interval having a fixed length is characterized by a start time is merely exemplary and does not constitute limitation on the various embodiments of the present invention.

According to one embodiment of the present invention, a count value may also be contained in each database record, representing the number of coded values contained in the data package. A structure of such a database record is as shown by a numeral 652. A count field CTR is contained in this database record, representing the number of coded values contained in data package TVP. For example, data package TVP of the database record as shown contains 6 coded values, and accordingly, a value of field CTR is 6.

The above-described process of a method for processing time series data involves storage of time series data. It should be pointed out that the order of steps in the method shown in FIG. 2 is merely exemplary and may have many variations in practice. For example, even if the order of Step 820 and Step 830 is changed, no impact is exerted on effects of the embodiments of the method of the present invention. Therefore, the order of the various steps shown in FIG. 2 does not constitute a strict limitation on the present invention. By means of the above method, not only a storage space for storing time series data can be reduced, but also the number of database records of time series data can be stored; therefore, disk I/O operations for accessing stored time series data can be reduced, so that the performance of the entire database system can be improved.

After time series data are stored using the above method, a query may be executed in response to a query request for time series data.

FIG. 2 schematically shows a process for processing a query on time series data according to one embodiment of the present invention, the process comprising Steps 262-268 below.

In Step 262, a query on an original value in time series data is received, the query containing a timestamp-based query condition.

The received query may be, for example, a query Q1 on an original value of a sensor with a device identification of "9093":

"getValueResult(*,Temperature, 20120716.10:47:00, 20120716.10:50)"

Query Q1 contains a timestamp-based query condition "20120716.10:47:00, 20120716.10:50," i.e. "a timestamp between 20120716.10:47:00 and 20120716.10:50 (excluded)." In other words, query Q1 means querying an original value OV, i.e. "temperature" conforming to the query condition in the database table with the data structure as shown in Table 411, by taking timestamp TS as an entry.

In Step 264, a corresponding query on a data package is generated according to the received query Q1.

For example, a query Q2 on a data package TVP is generated according to query Q1:

"select TVP from Table_650 where TS>=20120716.10: 47:00 and TS<20120716.10:50:00"

Query Q2 means querying a data package TVP whose start time ST is between 20120716.10:47:00 and 20120716.10:50:00 (excluded) in a database table Table_650 shown in FIG. 6.

In Step 266, the generated query is executed to obtain a data package.

For example, with respect to the database table shown in FIG. 4B, three data packages may be obtained, which are data packages of records with respective start times of 20120716.10:47:00, 20120716.10:48:00 and 20120716.10: 49:00.

In Step 268, according to the predetermined monotone numerical compression coding scheme, a coded value in the obtained data package conforming to the query condition is restored to a corresponding original value as a result of the received query.

For example, coded values of the data package with a start time of 20120716.10:47:00 which conform to the query condition are 21496, 21443, 21470, 21417, 21548 and 21548 respectively, which are generated from respective original values according to Equation (1). Therefore, these coded values are restored to corresponding original values according to the same Equation (1).

Take a coded value 21496 as an example. At this point, CV=21496, and an inverse operation is performed below according to Equation (1):

$$OV=[CV/65536*(200-(-50))-50]=32.00071=32.0$$

OV=32.0 is an original value resulting from restoring the coded value 21496 according to the predetermined monotone numerical compression coding scheme.

In the above equation, "[ ]" represents a rounding operation.

It can be verified that in the manner, 21443, 21470, 21417, 21548 and 21548 in data packages with a start time of a database record 20120716.10:47:00 can be restored to 31.8, 31.9, 31.7, 32.2 and 32.2 respectively.

Similarly, coded values in data packages (not shown) with start times of records 20120716.10:48:00 and 20120716.10:49:00 that conform to the query condition can be respectively restored to corresponding original values, which is not detailed here.

Note in the foregoing illustration, the descriptions of Query Q1, Query Q2 and the process of query are illustrative. Those skilled in the art may design various queries and various embodiments of execution based on the data structure shown in FIG. 7.

Note in the above manner of querying time series data on the basis of the data structure of storing time series data of the method according to the embodiment of the present invention, the number of database records to be outputted is cut down, so that disk I/O operations are reduced. Since the CPU speed is much larger than the disk I/O operation speed, the time spent in processing numerical conversion in the above process is trivial as compared with the time saved by reducing disk I/O operations.

A method for storing and querying time series data has been illustrated in conjunction with embodiments. Under the same inventive concept, the present invention further discloses another method for processing time series data.

Figure 3:
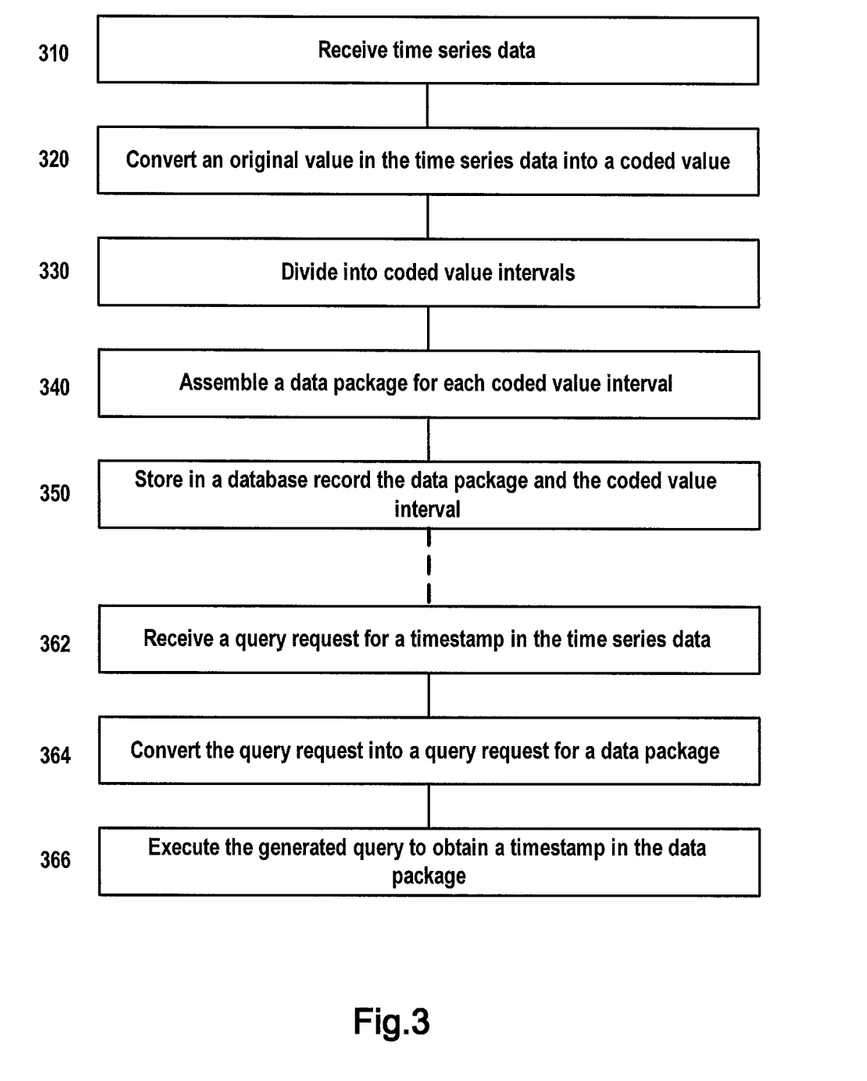
FIG. 3 shows a schematic flowchart of a method according to another embodiment of the present invention.

FIG. 3 schematically represents a flowchart of a method for processing time series data according to another embodiment of the present invention.

Various embodiments of the method shown in FIG. 3 are illustrated in detail below with reference to figures.

As shown in FIG. 3, the method for processing time series data starts in Step 310.

In Step 310, a time series data set is received, wherein each element of the time series data set contains a timestamp and an original value associated with the timestamp.

Step 310 is substantially the same as Step 210 of the method shown in FIG. 2 and thus is not detailed. Hereinafter, still take time series data set S in FIG. 4A as the example of the time series data set received in Step 310.

In Step 320, each original value is converted into a coded value occupying a smaller storage space, according to a predetermined monotone numerical compression coding scheme.

Also, Step 320 is substantially the same as step 220 shown in FIG. 2, and a result is also as shown in Table 521 and Table 522 in FIG. 5, which is not detailed here.

In Step 330, coded value intervals are divided for coded values.

According to one embodiment of the present invention, the dividing coded value intervals for coded values of Step 330 comprises: dividing coded values with the same high-order byte into one coded value interval and using the high-order byte as a coded value interval identification.

Take a coded value B1B2 shown in the 4$^{th}$ column of Table 521 in FIG. 5 as an example. Since the high-order byte B1 of 0X53F8, 0X53C3 and 0X53DE is 0X53, 0X53F8, 0X53C3 and 0X53DE are divided into the same coded value interval, and B1=0X53 is used as a coded value interval identification for this coded value interval.

Likewise, since the high-order byte B1 of X5446, 0X542C and 0X542C is 0X54, X5446, 0X542C and 0X542C are divided into the same coded value interval, and B1=0X54 is used as a coded value interval identification for this coded value interval.

For another example, take an example of a coded value B1B2B3 shown in the 4$^{th}$ column of Table 522 in FIG. 5, since their high-order byte B1 is 0X19, X193CA5, 0X1916C6, 0X1929B6 . . . are divided into the same coded value interval, and 0X19 is used as a coded value interval identification for this coded value interval.

In Step 340, regarding each coded value interval, each coded value and its timestamp in the coded value interval are packaged into a data package such that the data package contains a low-order byte of each coded value and a timestamp corresponding to the coded value.

Figure 7:
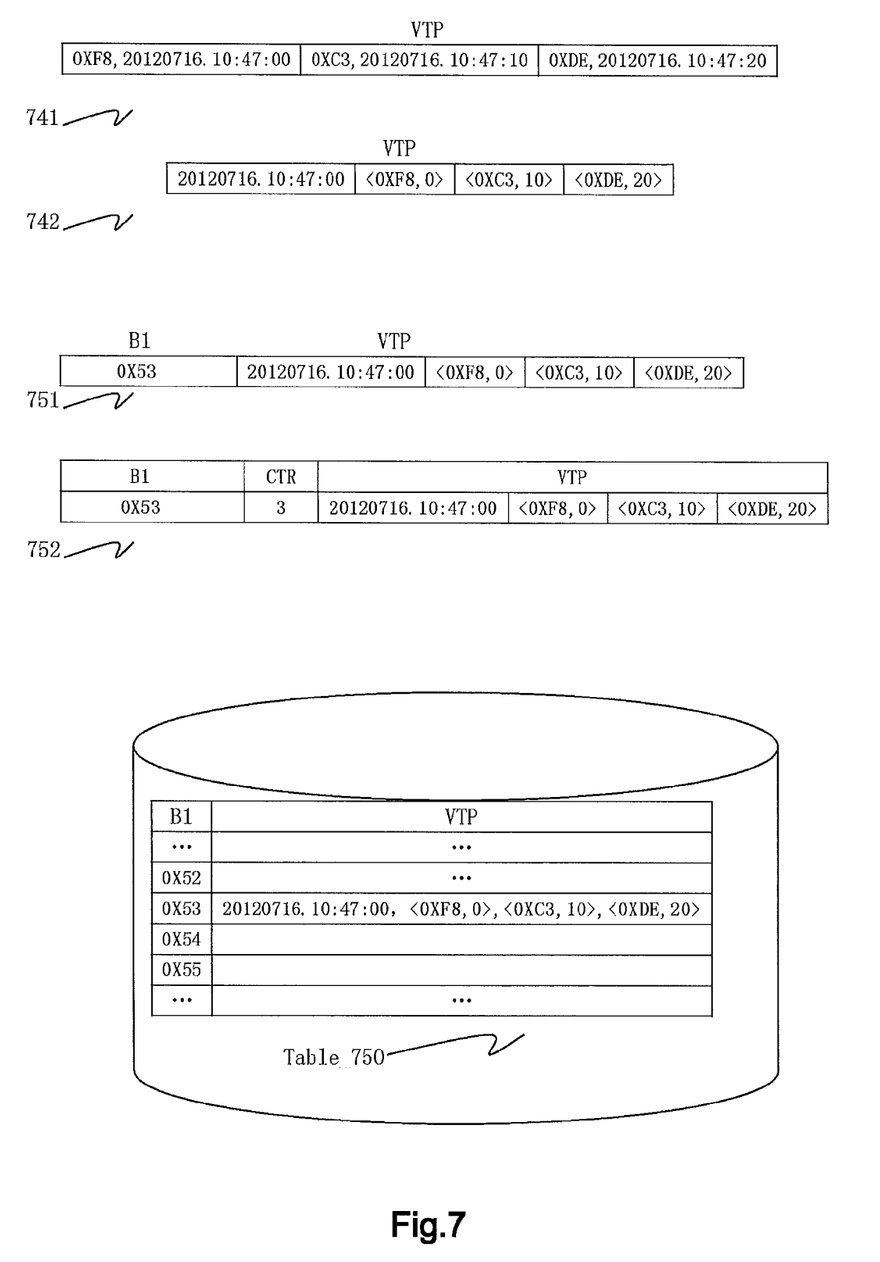
FIG. 7 schematically represents various data structures for storing time series data according to another embodiment of the present invention.

With reference to FIG. 7, this figure schematically shows various data structures for storing time series data according to one embodiment of the present invention.

A numeral 741 in FIG. 7 denotes a data package VTP that is assembled from each coded value in a coded value interval characterized by B1=0X53 and its timestamp. As described above, the coded value interval characterized by B1=0X53 contains 3 coded values, whose low-order bytes are 0XF8, 0XC3 and 0XDE respectively. Data package VTP 741 contains low-order bytes of all coded values in the coded value interval characterized by B1=0X53 and timestamps corresponding to the coded values: <0XF8,20120716.10:47:00>, <0XC3,20120716.10:47:10> and <0XDE, 20120716.10:47:20>.

According to one embodiment of the present invention, times represented by all timestamps in the time series data set constitute a time series having fixed intervals. In this case, a data package that is assembled from each coded value in a coded value interval and its timestamp contains the following data: a reference timestamp, a low-order byte (B2 in Table 521 of FIG. 5 or B2B3 in Table 522 of FIG. 5) of each coded value, as well as a time difference $\Delta$ between a timestamp corresponding to the coded value and the reference timestamp.

A numeral 742 in FIG. 7 denotes another example of data package VTP that is assembled from each coded value in a coded value interval characterized by B1=0X53 and its timestamp.

The data package denoted by numeral 742 contains two portions:
  a reference timestamp ST, e.g. 20120716.10:47:00; and
  a low-order byte B2 of each coded value and a time difference $\Delta$ between a timestamp corresponding to the coded value and the reference timestamp, i.e. <0XF8, 00>, <0XC3,10> and <0XDE,20>.

Time difference $\Delta$ may be a value representing the number of intervals. For example, $\Delta$=10 (intervals) may represent there is a difference of 10 intervals between a timestamp corresponding to a coded value and reference timestamp ST. Since the time length L of each interval is fixed, it may be derived from reference timestamp ST, $\Delta$ and L that a timestamp corresponding to the coded value is ST+$\Delta$*L.

Time difference $\Delta$ may also be a time value, e.g. $\Delta$=10 (seconds). In this case, a timestamp corresponding to the coded value is ST+$\Delta$.

In a word, each coded value and its corresponding timestamp may be derived from data pairs <0XF8,00>, <0XC3, 10> and <0XDE,20>. Hereinafter, the various embodiments of the present invention are illustrated in the context where time difference $\Delta$ is a time value.

For example, in the data pair <0XF8, 00>, B2=0XF8, since the target's high-order byte B1="0X53," it may be derived that the coded value is B1B2="0X53F8." $\Delta$=0 is a time difference between a timestamp corresponding to the coded value and a reference timestamp; since the reference timestamp is 20120716.10:47:00, it may be derived that a timestamp corresponding to the coded value is 20120716.10:47:00+0, i.e. "20120716.10:47:00."

Likewise, it may be derived from <0XC3,10> that it represents a coded value 0X53C3 and a corresponding timestamp 20120716.10:47:10; and it may be derived from <0XDE, 20> that it represents a coded value 0X53DE and a corresponding timestamp 20120716.10:47:20.

In Step 350, the data package and the coded value interval are stored in a database record.

With reference to FIG. 7, a numeral 751 in FIG. 7 denotes an example of database record. As shown in this figure, a database record 751 at least contains two fields: a coded value interval identification B1 and a data package VTP.

The coded value interval identification here adopts a common high-order byte B1=0X53 of all coded values in the coded value interval.

With reference to FIG. 7, a symbol Table_750 in FIG. 7 denotes an example of database table which corresponds to Table 411. Database table Table_750 as shown in FIG. 7 contains a plurality of database records having a data structure as shown by numeral 751. For example, a database record contains a coded value interval identification B1=0X53 and a corresponding data package VTP=20120716.10:47:00, <0XF8,0>,<0XC3,10>,<0XDE, 20>.

According to one embodiment of the present invention, each database record further contains a count value, representing the number of coded values contained in the data package. A structure of such a database record is as shown by a numeral 752. A count field CTR is contained in this database record, representing the number of coded values contained in data package VTP. For example, data package VTP of the database record as shown contains 3 coded values, and accordingly, the value of field CTR is 3.

Those skilled in the art should understand in practically implementing the present invention, coded values intervals may be represented in other manners. For example, a coded value interval may be characterized by one or more bits of the coded value or two high-order bytes of a three-byte coded value B1B2B3. Therefore, the embodiment of using a high-order byte B1 of a two-byte coded value B1B2 to characterize a coded value interval is merely exemplary and does not constitute limitation on the various embodiments of the present invention.

Similar to the method for processing time series data as shown in FIG. 2, the above-described method for processing time series also involves storage of time series data. By means of the above method, not only a storage space for storing time series data can be reduced, but also the number of database records of time series data can be stored; therefore, disk I/O operations for accessing stored time series data can be reduced, so that the performance of the entire database system can be improved.

After time series data are stored using the above method, a query may be executed in response to a query request for time series data.

FIG. 3 schematically shows a process for processing a query on time series data according to one embodiment of the present invention, the process comprising Steps 362-366 below.

In Step 362, a query on a timestamp in time series data is received, the query containing an original value-based query condition.

The received query may be, for example, a query Q3 on a timestamp of a sensor with a device number of 9093:
"getTSResult(*,TS, 32.0,32.5)"

Query request Q3 contains an original value-based query condition "32.0,32.5," i.e. an original value between 32.0 and 32.5. In other words, query Q3 means querying timestamps corresponding to all original values that conform to the query condition in the database table as shown in Table 411, by taking original value OV as an entry.

In Step 364, the query on a timestamp in time series data is converted into a query on a timestamp on a data package according to the predetermined monotone numerical compression coding scheme.

For example, key values in range query Q3 are 32.0 and 32.5. Then, a query Q4 on a data package VTP in the database table Table_750 is generated according to query Q3.

According to Equation (1), original value 32.0 is converted into 0X53F8, and original value 32.5 is converted into 0X547B.

Q4="select TS from Table_750 where B1>=0X53 and B1<=0X54"

Query Q4 means querying in database table Table_4 a data package VTP whose high-order byte characterizing a coded value interval is between 0X53 and 0X54.

In Step 366, the generated query Q4 is executed to obtain a data package, and timestamps contained in the data package corresponding to each coded value that conforms to the query condition are regarded as a query result.

For example, with respect to database table Table_750 shown in FIG. 7, 2 data packages may be obtained:

contents of the first data package VTP are <20120716.10: 47:00>,<0XF8,00>,<0XC3,10>,<0XDE,20>; from this data package, the following timestamps conforming to the query condition specified in Q3 may be derived: 20120716.10:47: 00, 20120716.10:47:10, 20120716.10:47:20.

contents of the second data package VTP are <20120716.10:47:00>,<0X1903D3,30>,<0X0X196276, 40>,<0X0X196276,50>; from this data package, the following timestamps may be derived: 20120716.10:47:30, 20120716.10:47:40, 20120716.10:47:50.

Note in the foregoing illustration, the descriptions of instances such as time series data set S, database table Table_750, Query Q3 and Query Q4 and the description of the process of corresponding queries are illustrative. In implementing the present invention, those skilled in the art may design other variations of the above embodiments for various application environments, based on the foregoing descriptions and with respect to the data structure shown in FIG. 7.

The various embodiments of the method for processing time series data of the present invention have been illustrated above. Under the same inventive concept, the present invention further provides an apparatus for processing time series data.

Figure 8:
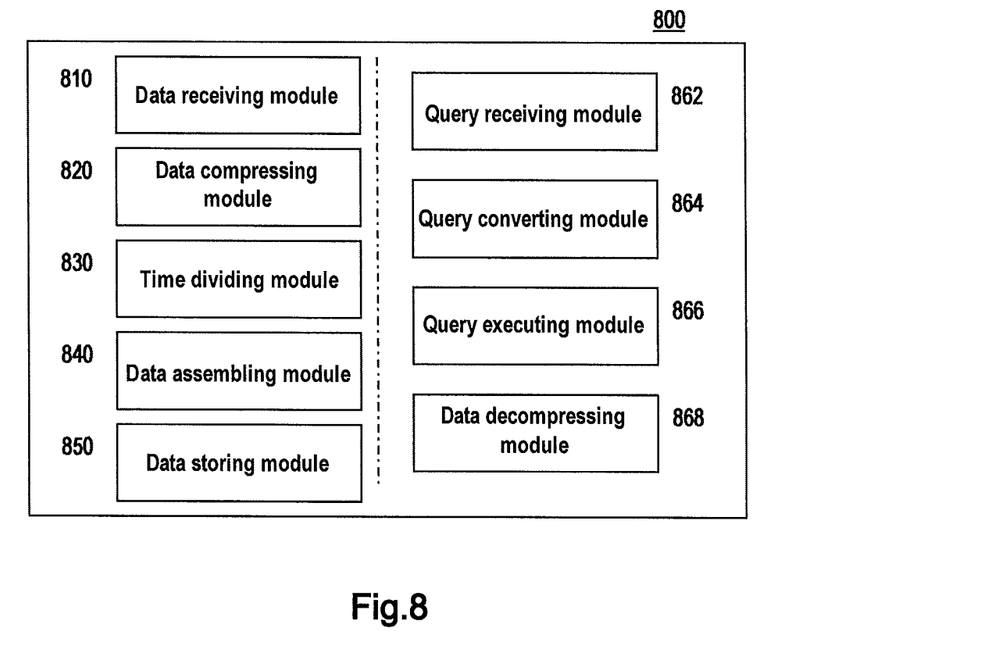
FIGS. 8 and 9 each represents a schematic block diagram of an apparatus according to one embodiment of the present invention.

With reference to FIG. 8, this figure schematically shows a block diagram of an apparatus for processing time series data according to one embodiment of the present invention.

An apparatus 800 for processing time series data as shown in FIG. 8 comprises: a data receiving module 810, a data compressing module 820, a time dividing module 830, a data assembling module 840 and a data storing module 850.

Data receiving module 810 is configured to receive a time series data set, wherein each element of the time series data set contains a timestamp and an original value associated with the timestamp, and times represented by all timestamps constitute a time series having fixed time intervals.

Data compressing module 820 is configured to convert each original value into a coded value occupying a smaller storage space, according to a predetermined monotone numerical compression coding scheme.

Time dividing module 830 is configured to divide the times represented by all timestamps into a plurality of time intervals having a predetermined length.

Data assembling module 840 is configured to assemble coded values corresponding to all timestamps within each time interval into a data package such that the data package contains coded values arranged in an order of timestamps.

Data storing module 850 is configured to store in a database record each data package and its associated identification of a time interval.

According to one embodiment of the present invention, the predetermined monotone numerical compression coding scheme comprises any one of a quantization compression coding scheme and an arc tangent compression coding scheme.

According to one embodiment of the present invention, apparatus 800 further comprises: a query receiving module 862, a query converting module 864, a query executing module 866 and a data decompressing module 868.

Query receiving module 862 is configured to receive a query on an original value in the time series data, the query containing a timestamp-based query condition.

Query converting module 864 is configured to generate a corresponding query on a data package according to the received query.

Query executing module 866 is configured to execute the generated query to obtain the data package.

Data decompressing module 868 is configured to restore a coded value in the obtained data package conforming to the query condition to a corresponding original value as a request of the received query, according to the predetermined monotone numerical compression coding scheme.

According to one embodiment of the present invention, the data storing module of apparatus 800 is further configured to store in the database record the number of coded values contained in the data package.

According to one embodiment of the present invention, the time series data set contains time series data received from a sensor, wherein the timestamp and a value associated with the timestamp contained in each element of the time series data set are a sampling time from the sensor and a value associated with the sampling time respectively.

Figure 9:
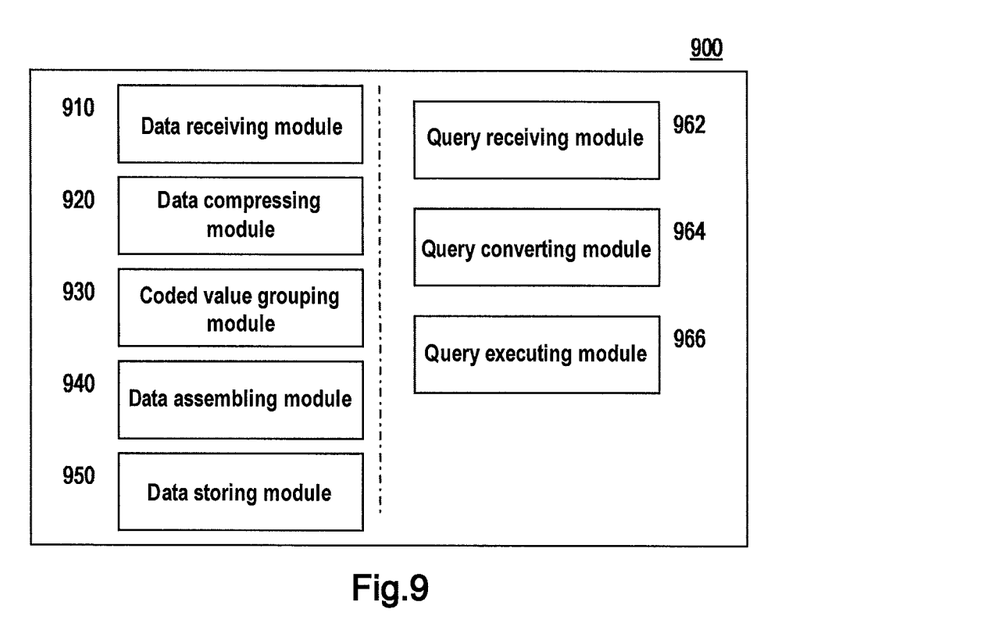

With reference to FIG. 9, this figure schematically shows a block diagram of an apparatus for processing time series data according to another embodiment of the present invention.

An apparatus 900 for processing time series data as shown in FIG. 9 comprises: a data receiving module 910, a data compressing module 920, a coded value grouping module 930, a data assembling module 940 and a data storing module 950.

Data receiving module 910 is configured to receive a time series data set, wherein each element of the time series data set contains a timestamp and an original value associated with the timestamp, and times represented by all timestamps constitute a time series having fixed intervals.

Data compressing module 920 is configured to convert each original value into a coded value occupying a smaller storage space, according to a predetermined monotone numerical compression coding scheme.

Coded value grouping module 930 is configured to divide coded values into coded value intervals.

Data assembling module 940 is configured to, for each coded value interval, assemble each coded value in the coded value interval and its timestamp into a data package such that the data package contains a low-order byte of each coded value and a timestamp corresponding to the coded value.

Data storing module 950 is configured to store in a database record each data package together with an identification characterizing a corresponding coded value interval.

According to one embodiment of the present invention, the predetermined monotone numerical compression coding scheme comprises any one of a quantization compression coding scheme and an arc tangent compression coding scheme.

According to one embodiment of the present invention, coded value grouping module 930 is further configured to divide coded values having the same high-order byte into one coded value interval, and data storing module 950 is further configured to use the high-order byte as an identification of the coded value interval.

According to one embodiment of the present invention, times represented by all timestamps in the time series data set constitute a time series having fixed time intervals, and data assembling module 940 is further configured to cause the data package to contain a reference timestamp, a low-order byte of each coded value and a time difference between a timestamp corresponding to the coded value and the reference timestamp.

According to one embodiment of the present invention, apparatus 900 further comprises: a query receiving module 962, a query converting module 964 and a query executing module 966.

Query receiving module 962 is configured to receive a query on a timestamp in the time series data, the query containing an original value-based query condition.

Query converting module 964 is configured to convert the query on the timestamp in the time series data into a query on a timestamp in a data package, according to the predetermined monotone numerical compression coding scheme.

Query executing module 966 is configured to execute the generated query to obtain the data package and regard timestamps in the data package corresponding to each coded value that conforms to the query condition as a query result.

The various embodiments of the apparatus for processing time series data of the present invention have been illustrated above. As the various embodiments of the method for processing time series data of the present invention have been illustrated in detail, contents that may be derived from or that are repetitions of the foregoing illustration of the various embodiments of the method for processing time series data are omitted in the illustration of the various embodiments of the apparatus for processing time series data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing time series data comprising:
receiving a time series data set, wherein each element of the time series data set contains a timestamp and an original value associated with the timestamp, and times represented by all timestamps constitute a time series having fixed time intervals;
converting each original value into a coded value occupying a smaller storage space according to a predetermined monotone numerical compression coding scheme;
dividing the times represented by all timestamps into a plurality of time intervals having a predetermined length;
assembling coded values corresponding to all timestamps within each time interval into one of a plurality of data packages, such that each data package contains a plurality of coded values arranged in an order of timestamps; and
storing in a database record each data package and its associated identification of a time interval, wherein each data package containing a plurality of coded values is stored in the database record in association with a single respective identified time interval;
wherein the storing in a database record each data package and its associated identification of a time interval further comprises storing in the database record a count value of a number of coded values contained in the data package.

2. The method according to claim 1, wherein the predetermined monotone numerical compression coding scheme comprises any of:
a quantization compression coding scheme; or
an arc tangent compression coding scheme.

3. The method according to claim 2, further comprising:
receiving a query on an original value in the time series data, the query containing a timestamp-based query condition;
generating a corresponding query on a data package according to the received query;
executing the generated query to obtain the data package;
according to the predetermined monotone numerical compression coding scheme, restoring a coded value in the obtained data package conforming to the query condition to a corresponding original value as a result of the received query.

4. The method according to claim 1, wherein the time series data set contains time series data received from a sensor, and wherein the timestamp and a value associated with the timestamp contained in each element of the time series data set are a sampling time from the sensor and a value associated with the sampling time, respectively.

5. A method for processing time series data, comprising:
receiving a time series data set, wherein each element of the time series data set contains a timestamp and an original value associated with the timestamp;
converting each original value into a coded value occupying a smaller storage space according to a predetermined monotone numerical compression coding scheme, wherein each coded value has a high-order byte and a low-order byte;
dividing coded values into coded value intervals;
for each coded value interval, assembling each coded value in the coded value interval and its timestamp into a data package, such that the data package contains for each coded value: (a) a low-order byte only, and (b) a timestamp corresponding to the coded value; and
storing in a database record each data package together with an identification characterizing a corresponding coded value interval;
wherein coded values having the same high-order byte are divided into one coded value interval, and the high-order byte is used as an identification of the coded value interval.

6. The method according to claim 5, wherein the predetermined monotone numerical compression coding scheme comprises any of:
a quantization compression coding scheme; or
an arc tangent compression coding scheme.

7. The method according to claim 6, wherein times represented by all timestamps in the time series data set constitute a time series having fixed time intervals, and the data package contains a reference timestamp, a low-order byte of each coded value and a time difference between a timestamp corresponding to the coded value and the reference timestamp.

8. The method according to claim 7, further comprising:
receiving a query on a timestamp in the time series data, the query containing an original value-based query condition;
converting the query on the timestamp in the time series data into a query on a timestamp in a data package, according to the predetermined monotone numerical compression coding scheme; and
executing the generated query to obtain the data package and respective timestamps in the data package corresponding to each coded value that conforms to the query condition as a query result.

9. An apparatus for processing time series data comprising:
a data receiving module configured to receive a time series data set, wherein each element of the time series data set contains a timestamp and an original value associated with the timestamp, and times represented by all timestamps constitute a time series having fixed time intervals;
a data compressing module configured to convert each original value into a coded value occupying a smaller storage space, according to a predetermined monotone numerical compression coding scheme;
a time dividing module configured to divide the times represented by all timestamps into a plurality of time intervals having a predetermined length;
a data assembling module configured to assemble coded values corresponding to all timestamps within each time interval into one of a plurality of data packages, such that each data package contains a plurality of coded values arranged in an order of timestamps; and
a data storing module configured to store in a database record each data package and its associated identification of a time interval, wherein each data package containing a plurality of coded values is stored in the database record in association with a single respective identified time interval;
wherein the storing in a database record each data package and its associated identification of a time interval further comprises storing in the database record a count value of a number of coded values contained in the data package.

10. The apparatus according to claim 9, wherein the predetermined monotone numerical compression coding scheme comprises any of:
a quantization compression coding scheme; or
an arc tangent compression coding scheme.

11. The apparatus according to claim 10, further comprising:
- a query receiving module configured to receive a query on an original value in the time series data, the query containing a timestamp-based query condition;
- a query converting module configured to generate a corresponding query on a data package according to the received query;
- a query executing module configured to execute the generated query to obtain the data package; and
- a data decompressing module configured to, according to the predetermined monotone numerical compression coding scheme, restore a coded value in the obtained data package conforming to the query condition to a corresponding original value as a result of the received query.

12. The apparatus according to claim 9, wherein the time series data set contains time series data received from a sensor, and wherein the timestamp and a value associated with the timestamp contained in each element of the time series data set are a sampling time from the sensor and a value associated with the sampling time, respectively.

13. An apparatus for processing time series data, comprising:
- a data receiving module configured to receive a time series data set, wherein each element of the time series data set contains a timestamp and an original value associated with the timestamp;
- a data compressing module configured to convert each original value into a coded value occupying a smaller storage space, according to a predetermined monotone numerical compression coding scheme, wherein each coded value has a high-order byte and a low-order byte;
- a coded value grouping module configured to divide coded values into coded value intervals;
- a data assembling module configured to, for each coded value interval, assemble each coded value in the coded value interval and its timestamp into a data package such that the data package contains for each coded value: (a) a low-order byte only; and (b) a timestamp corresponding to the coded value; and
- a data storing module configured to store in a database record each data package together with an identification characterizing a corresponding coded value interval;
- wherein coded values having the same high-order byte are divided into one coded value interval, and the high-order byte is used as an identification of the coded value interval.

14. The apparatus according to claim 13, wherein the predetermined monotone numerical compression coding scheme comprises any of:
- a quantization compression coding scheme; or
- an arc tangent compression coding scheme.

15. The apparatus according to claim 14, wherein times represented by all timestamps in the time series data set constitute a time series having fixed time intervals, and the data assembling module is further configured to cause the data package to contain a reference timestamp, a low-order byte of each coded value and a time difference between a timestamp corresponding to the coded value and the reference timestamp.

16. The apparatus according to claim 15, further comprising:
- a query receiving module configured to receive a query on a timestamp in the time series data, the query containing an original value-based query condition;
- a query converting module configured to convert the query on the timestamp in the time series data into a query on a timestamp in a data package, according to the predetermined monotone numerical compression coding scheme; and
- a query executing module configured to execute the generated query to obtain the data package and respective timestamps in the data package corresponding to each coded value that conforms to the query condition as a query result.

\* \* \* \* \*